Sept. 15, 1959  C. W. HOOVER, JR  2,904,679
SCALER CIRCUIT
Filed May 19, 1953  6 Sheets-Sheet 1
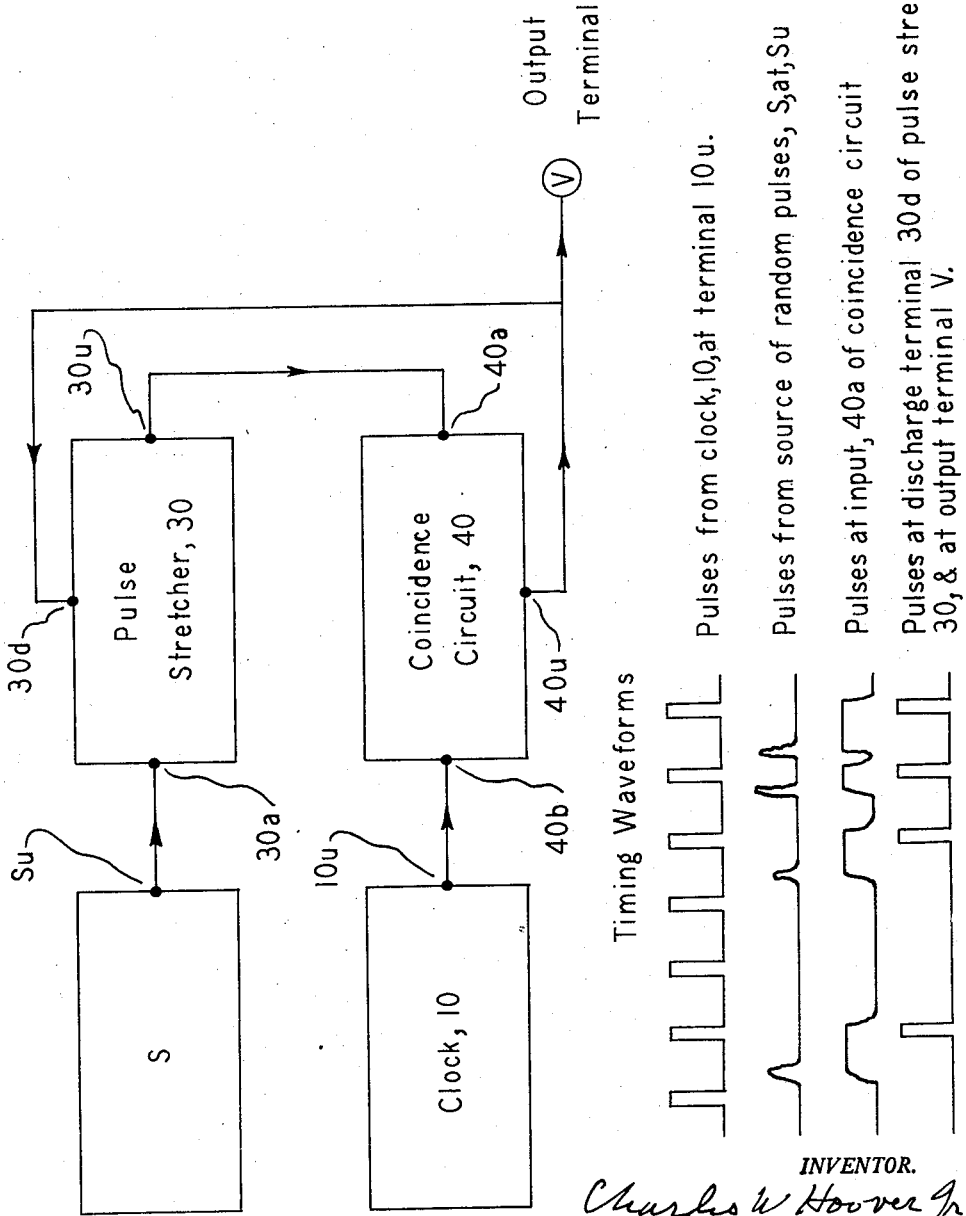
INVENTOR.
Charles W Hoover Jr
BY
Byerly, Townsend & Watson
Attorneys

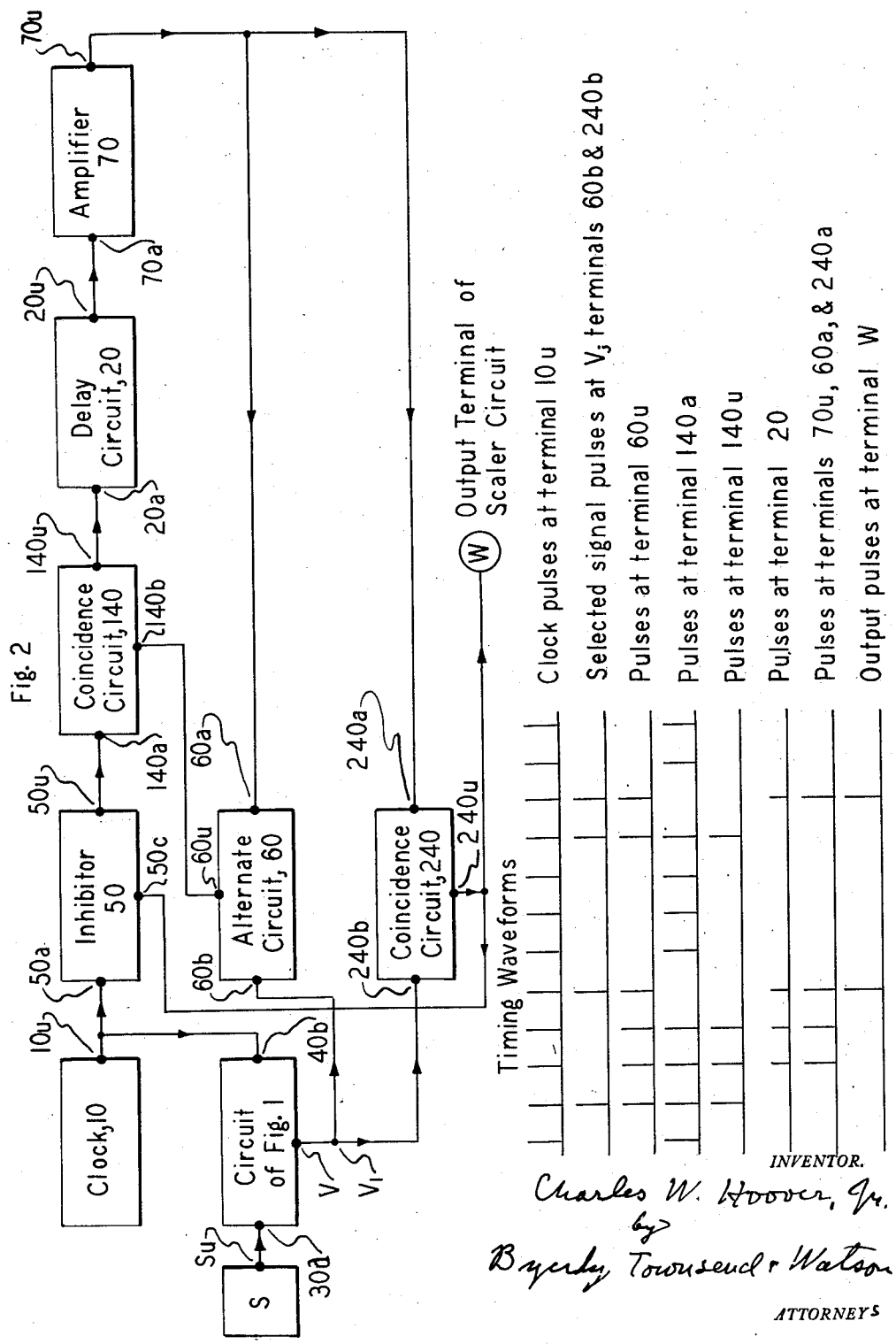

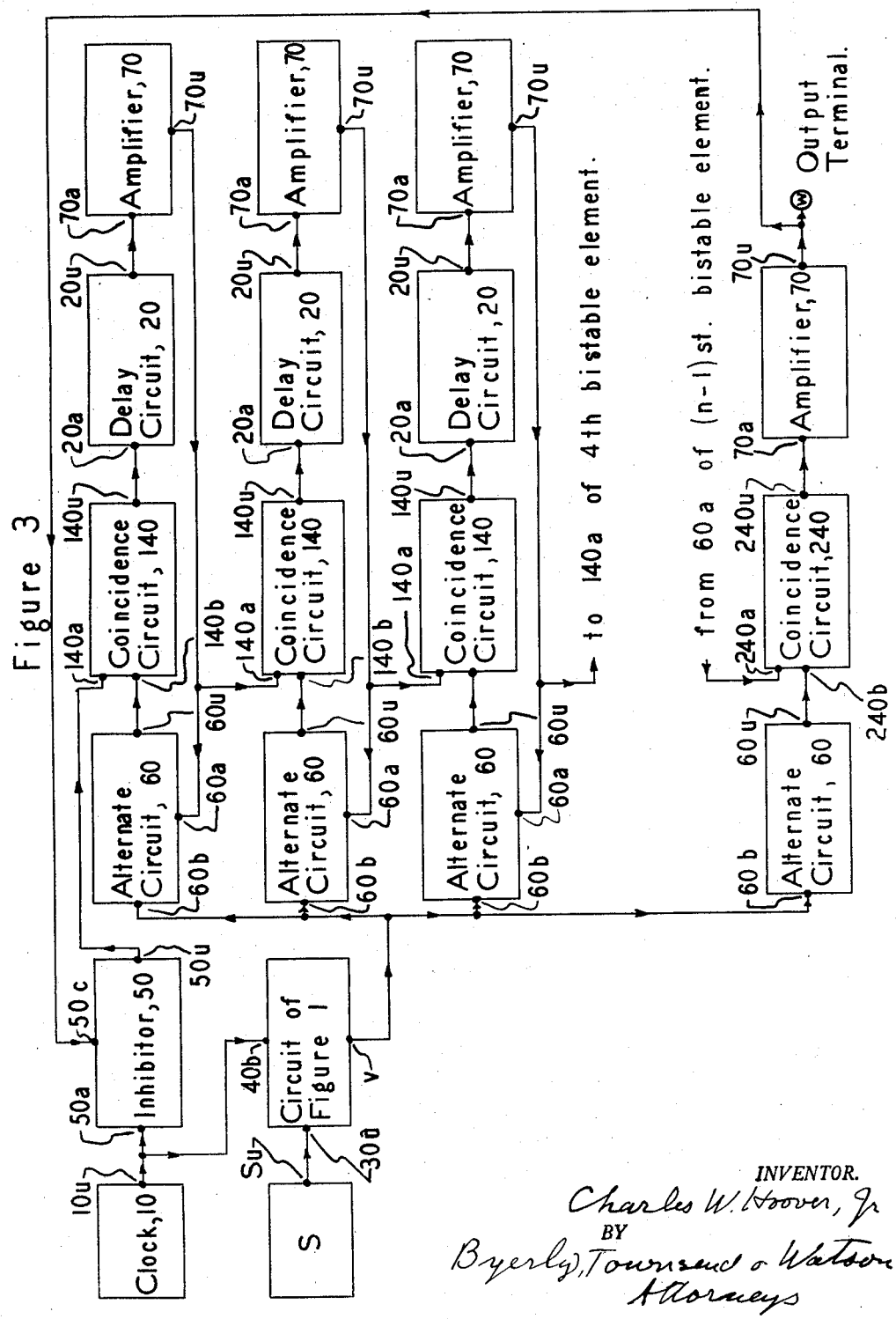

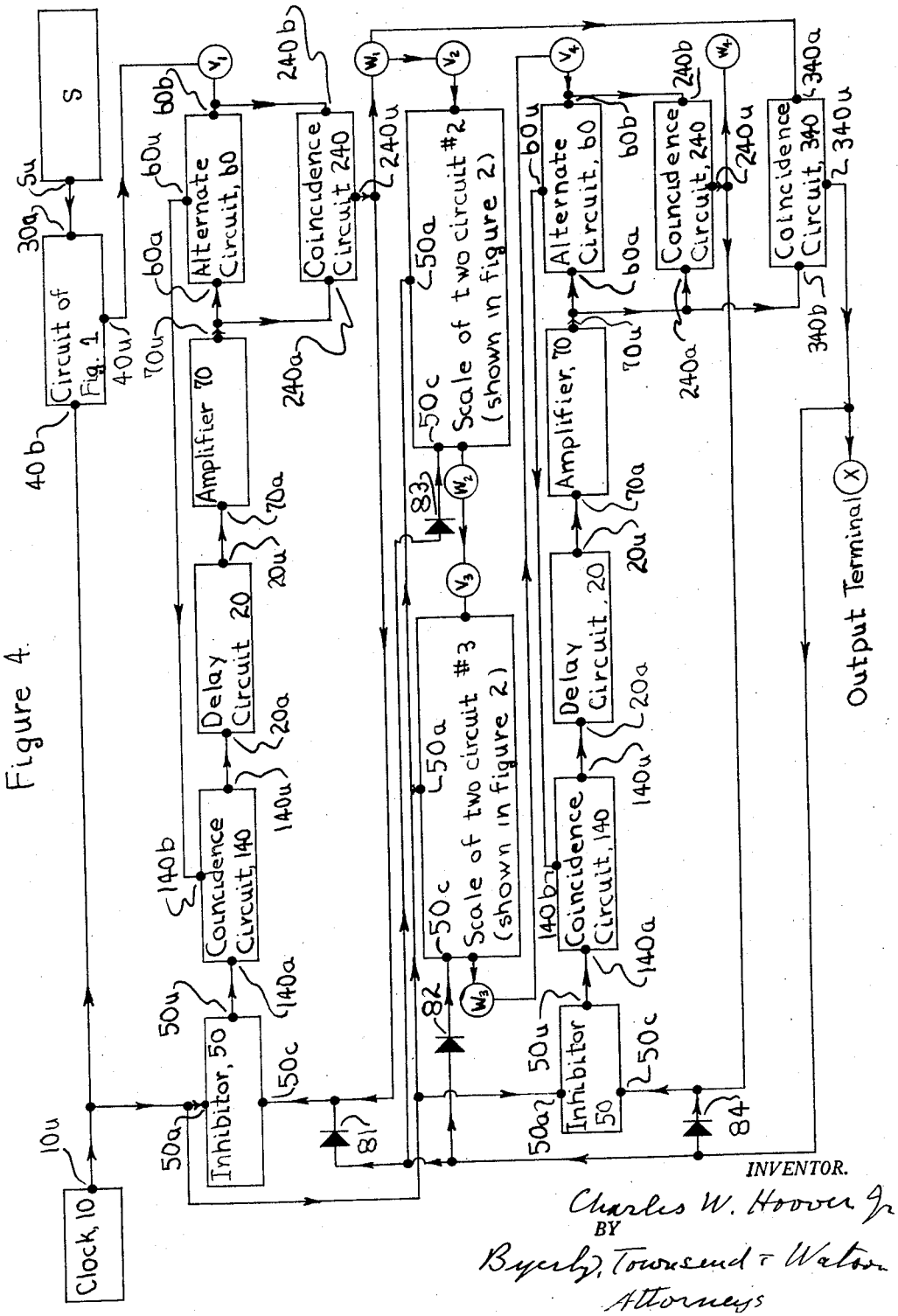

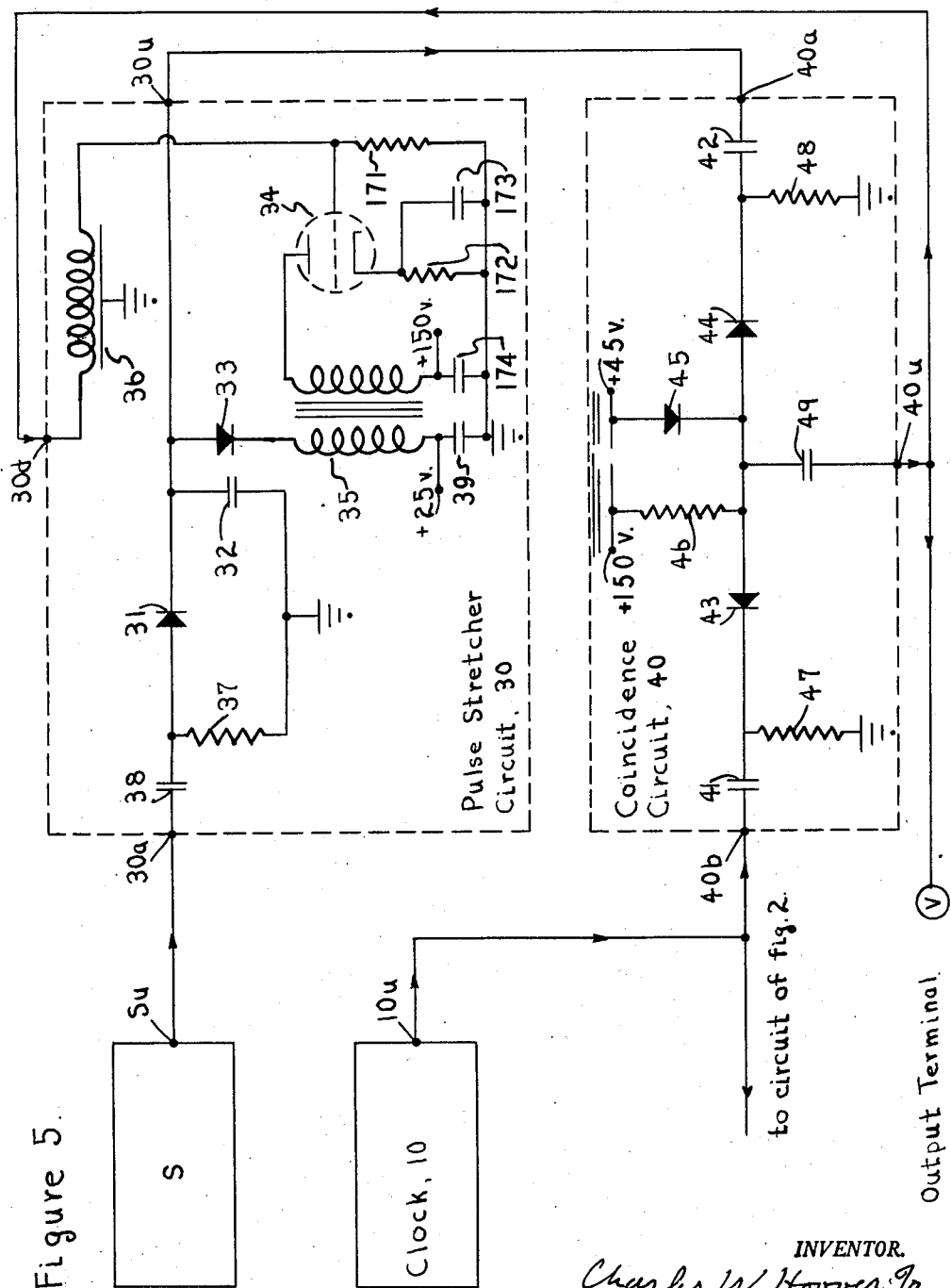

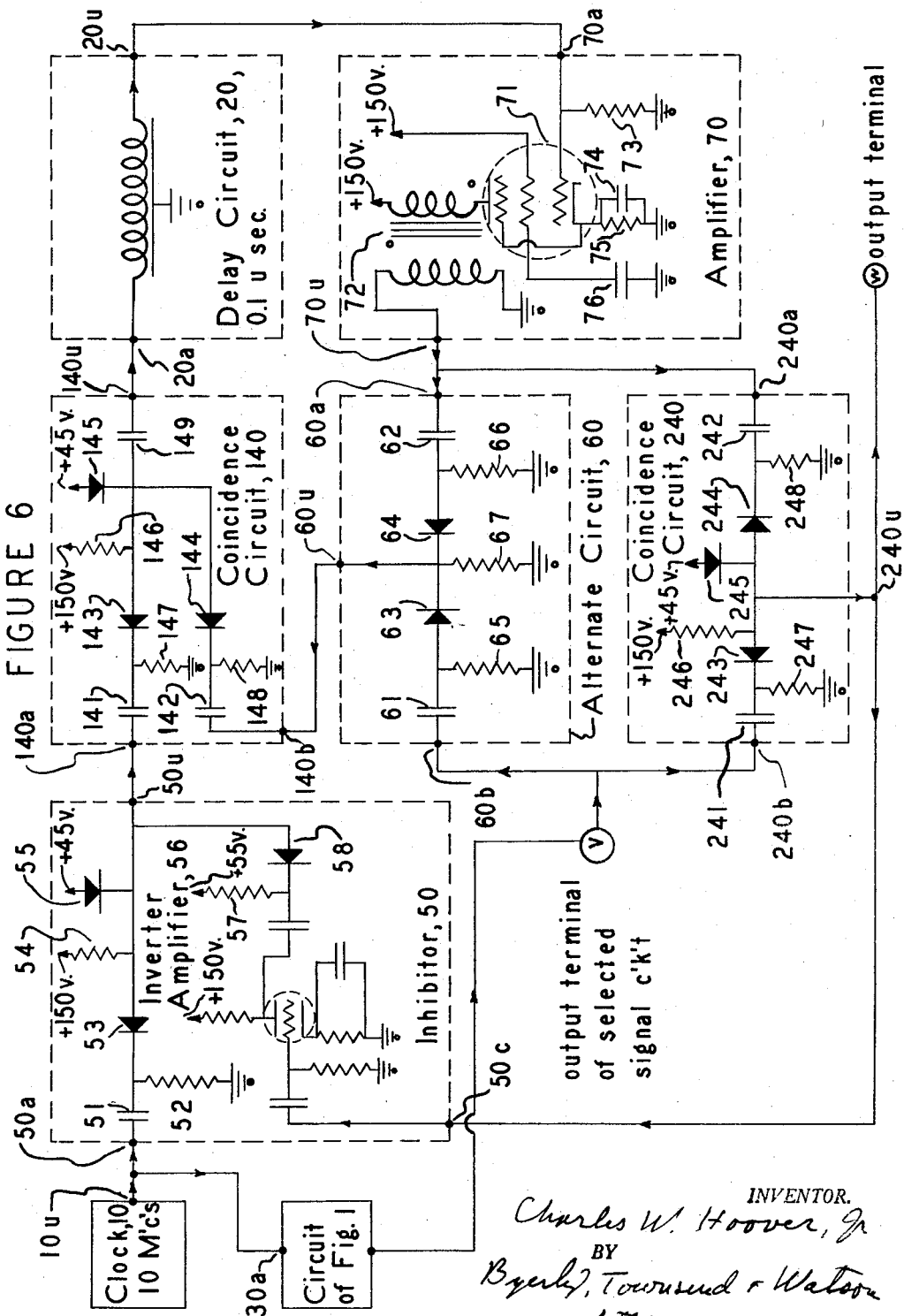

United States Patent Office 2,904,679
Patented Sept. 15, 1959

2,904,679

SCALER CIRCUIT

Charles W. Hoover, Jr., New Haven, Conn.

Application May 19, 1953, Serial No. 356,059

20 Claims. (Cl. 250—27)

This invention relates to a scaler circuit for producing a series of pulses equal to a simple fraction of the number of pulses in a series of randomly spaced pulses. The purpose of the invention is to facilitate the counting of nuclear and other random phenomena, and the invention effects a radical simplification of scaler circuits of Geiger counters, scintillation counters, photo-multipliers, proportional counters and the like. My new scaler circuit may be substituted for the scaler circuits ordinarily used in these instruments without requiring any other change in the instruments.

Natural radioactive decay is completely random in character and the number of disintegrations per second from the radioactive substance is in general very much larger than the rate at which a mechanical counter can be operated. For this reason, it is customary to employ so-called scaler circuits which give out one pulse for every $n$ pulses received. This lowers the rate to one which can be handled by a mechanical counter.

The scaler circuits now in use comprise a bi-stable element or a group of bi-stable elements in which vacuum tubes are used as the switching elements. Such circuits are expensive and have serious limitations which render them unreliable.

In many types of nuclear experiments, the pulses from the detector of radioactive decay come at very fast rates. $10^7$ pulses per second are not uncommon. Vacuum tube switching circuits are operating at the ultimate limit imposed by the vacuum tube characteristics when they are used in scaling circuits for impulses occurring at the rate of $10^7$ per second. Vacuum tube circuits for this very fast rate are, therefore, quite complicated, difficult to adjust and very expensive. Since each component tube is functioning at the limit of its ability, a small change in circuit paramaters is enough to put the circuit out of operation. This renders such circuits unreliable.

An object which is attained by my invention is to provide a scaler circuit which requires no vacuum tubes or similar devices as switching elements.

This object is achieved in accordance with my invention by combining randomly spaced pulses to be scaled with regularly or evenly spaced pulses produced by an oscillator. My new method of scaling involves two parts in each of which an oscillator or "clock" producing regularly spaced pulses is used.

In the first part of my method, the random pulses are combined with the clock pulses in such a way as to select a number of clock pulses equal to the number of random pulses. This step produces a series of signal pulses whose number is equal to the number of randomly spaced pulses and whose spacing corresponds approximately to the spacing of the random pulses, but differs from it to the extent that the time intervals between successive signal pulses are mutliples of the time interval between successive clock pulses and each selected signal pulse is coincident with a clock pulse.

The second part of my method consists in utilizing the signal pulses produced by the first part to cycle a simple clock-operated bi-stable element which is cyclable only by pulses coincident with the clock pulses. As hereinafter explained, the switching of this bi-stable element is effected by simple rectifiers, such as germanium crystal diodes.

In describing my method and my new scaler circuit for carrying out the method, I shall refer to the accompanying drawings in which:

Fig. 1 is a block diagram of a circuit for carrying out the first part of my method;

Fig. 2 is a block diagram of a circuit for carrying out the second part of my method. It shows a scaler circuit having a scale of two to one;

Fig. 3 is a block diagram of a scaler circuit having a scale of $n$ to one;

Fig. 4 is a block diagram of a scaler circuit having a scale of ten to one;

Fig. 5 is a circuit diagram of the circuit indicated in the block diagram, Fig. 1; and Fig. 6 is a circuit diagram of the circuit indicated in the block diagram, Fig. 2.

To facilitate the understanding of my new scaler circuit for carrying out this method, I will first describe briefly the circuit elements used:

(1) The clock element 10 is a device for producing regularly spaced pulses. In the specific example which will be described, a ten megacycle oscillator is used as the clock element. This is appropriate in a scaler having a maximum rate of ten megacycles per second. In scalers operating at lower or higher speeds, oscillators of lower or higher frequency may be used as the clock element. The oscillator is operated Class C and its plate current pulses are used as the regularly spaced clock pulses.

(2) The delay circuit element 20 is a circuit for delaying a pulse for a period equal to the time interval between the beginning of successive clock pulses. Thus, when a ten megacycle clock is used, the delay interval of the delay circuit is 0.1 microsecond. In this case, an artificial line may be used as the delay circuit. In scalers operating at a faster rate, a coaxial line or a true transmission line may be used as the delay circuit.

(3) The pulse stretcher element 30 is essentially a condenser which is charged by a pulse applied to its input terminal $a$ and remains charged until a pulse is applied to its discharge terminal $d$ which is connected through a delay circuit having a delay period less than the interval between the clock pulses and approximately equal to the width or duration period of a single clock pulse.

(4) The coincidence circuit element 40, 140, 240 is a circuit having two input terminals $a$, $b$ and one output terminal $u$ and is so arranged that there is a pulse at the output terminal $u$ when and only when two coincident pulses are applied to the two input terminals $a$, $b$. Such a circuit may be constructed very simply by means of crystal diodes as hereinafter explained.

(5) The inhibitor element 50 when connected in a circuit prevents the passage of a pulse through this circuit whenever a pulse is applied coincidently to the actuating terminal $c$ of the inhibitor. Its operation is analogous to that of a relay-operated cut-off switch in a D.C. circuit. The inhibitor element may be constructed by means of crystal diodes and a polarity-inversion element as hereinafter explained.

(6) The alternate circuit element 60 has two input terminals $a$, $b$ and one output terminal $u$ and is so arranged that a pulse appears at the output terminal $u$ whenever a pulse is applied to either of the input terminals $a$, $b$. It contains rectifiers which prevent a pulse applied at one input terminal from affecting the circuit connected to the other input terminal.

The first part of my method is carried out by stretching or lengthening each random pulse until the occurrence of the clock pulse which follows the random pulse, and utilizing the coincident occurrence of a part of the stretched pulse and the clock pulse to produce a signal pulse. A circuit for effecting this operation is shown in the block diagram, Fig. 1. A source of random pulses (such as a detector of radioactive decay) S has its output $S_u$ connected to the input terminal $30a$ of a pulse stretcher 30. The output terminal $30u$ of the pulse stretcher is connected to the input terminal $40a$ of a coincidence circuit 40. The oscillator or clock 10 is connected to the other input terminal $40b$ of the coincidence circuit 40. The output terminal $40u$ of the coincidence circuit is connected to the output terminal $v$ of the circuit and also to the discharge terminal $30d$ of the pulse stretcher 30.

The operation of this circuit is apparent from the timing waveform diagram contained in Fig. 1. The regularly spaced pulses from the clock 10 reach the input $40b$ of the coincidence circuit 40, but cause no output from this circuit unless a voltage is applied coincidently to the other input $40a$ of the coincidence circuit. Each randomly spaced pulse from the terminal $S_u$ charges the condenser of the pulse stretcher 30, producing a voltage at the input $40a$ of the coincidence circuit 40 which continues until the next clock pulse occurs. At this time, voltage is applied to both the input terminals $40a$, $40b$ of the coincidence circuit so that a pulse is produced at the output $40u$ of the coincidence circuit. This pulse at the output has two effects: (1) It is applied to the discharge terminal $30d$ of the pulse stretcher to discharge the condenser at the end of the clock pulse so that the voltage produced by the random pulse ceases to operate on the intake terminal $40a$ of the coincidence circuit 40 and thus can have no further effect on the output of this circuit. (2) The output pulse is also led to the output terminal $v$ and provides one of the selected signal pulses hereinbefore described which is used in the second step of the method.

Although the emphasis so far in this specification has been on the conversion of randomly spaced pulses into selected signal pulses, each of which is coincident with a clock pulse, it should be noted that the first part of my method may also be employed in the same way to convert regularly spaced pulses into such selected signal pulses.

The second part of the method consists in using the selected signal pulses from the output terminal $v$ of the circuit shown in Fig. 1 to cycle a clock-operated bi-stable element.

A clock-operated bi-stable element is shown in Fig. 2. The clock 10 is connected to the input $20a$ of the delay circuit 20 through a coincidence circuit 140. The output $20u$ of the delay circuit 20 is connected back to the coincidence circuit 140. This connection most desirably contains an amplifier 70.

The parts thus far described form a bi-stable element, that is, an element which is stable in either one of two states. In the inactive state of the bi-stable element, the clock pulses arrive at the input terminal $140a$ of the coincidence circuit 140 but produce no pulses at the output $140u$ of this circuit as no voltage is applied to its input terminal $140b$. As a result, no pulses are passed through the delay circuit. In the active state of the bi-stable element, the clock pulses pass through the delay circuit 20. Each delayed pulse reaching the input $140b$ of the coincidence circuit 140 from the output $20u$ of the delay circuit 20 is coincident with the next clock pulse arriving at the input $140a$ of the coincidence circuit 140. Consequently, another pulse appears at the output $140u$ of the coincidence circuit 140, passes through the delay circuit 20, and returns to the input $140b$ of the coincidence circuit 140 coincidently with the arrival of the next clock pulse at the input $140a$. This keeps the coincidence circuit 140 conductive at the time of each clock pulse, producing a stable active state.

The bi-stable element is provided with switching elements including a starting element for shifting it from inactive state to active state and a stopping element for shifting it from active state to inactive state.

The starting elements is the alternate circuit 60 which is inserted in the feed-back from the delay circuit 20 between the amplifier 70 and the coincidence circuit 140. One of the input terminals $60a$ of the alternate circuit 60 is connected in the circuit from the output $20u$ of the delay circuit 20, while the other input terminal $60b$ of the alternate circuit is available for applying a starting pulse to the input $140b$ of the coincidence circuit 140 without affecting the operation of the parts connected to the input $60a$.

A single pulse coincident with one of the clock pulses is sufficient to switch the bi-stable element from its inactive state to its active state. The starting pulse is brought to the input $140b$ of the coincidence circuit 140 by applying it to the input $60b$ of the alternate circuit 60. Thus the starting pulse and a coincident clock pulse reach the terminals $140a$, $140b$ of the coincidence circuit 140 producing a pulse at the output $140u$ of this coincidence circuit which passes through the delay circuit 20 and back to the coincidence circuit 140. This places the bi-stable element in its active condition in which the clock pulses continue to pass through the delay circuit. If a pulse is applied to the input $60b$ of the alternate circuit 60 when the bi-stable element is in active state, it has no effect as the coincidence circuit 140 is already being rendered conductive by the pulses arriving at its input $140b$ from the delay circuit.

The stopping element for the bi-stable element consists of an inhibitor 50 in the connection between the clock 10 and the delay circuit 20.

A single pulse coincident with a clock pulse is sufficient to switch the bi-stable element from its active state to its inactive state. The stopping pulse is applied to the actuating terminal $50c$ of the inhibitor 50, thus preventing the clock pulse which is coincident with the stopping pulse from reaching the input terminal $20a$ of the delay circuit 20. There is, therefore, no delayed pulse at the input $140b$ of the coincidence circuit 140 to cooperate with the next clock pulse. Consequently no further pulses pass through the delay circuit 20 and the bi-stable element remains in its inactive state.

It is apparent that the bi-stable element may be cycled by first applying a pulse coincident with one of the clock pulses to the input $60b$ of the alternate circuit 60 to start the flow of pulses through the delay circuit, and then applying a pulse coincident with a clock pulse to the actuating terminal $50c$ of the inhibitor 50 to prevent one clock pulse from reaching the delay circuit and thus stopping the flow of pulses through the delay circuit.

It is to be noted that the bi-stable element as thus far described cannot be cycled by a series of pulses all of which are applied both to the input $60b$ of the alternate circuit and to the actuating terminal $50c$ of the inhibitor, because each pulse reaching the inhibitor terminal will prevent a clock pulse from reaching the delay circuit and will thus prevent the pulse reaching the terminal $140b$ from the alternate circuit from starting the flow of pulses through the delay circuit.

An important feature of my invention consists in overcoming this difficulty and providing means which make it possible to use successive signals to cycle the bi-stable element. This is accomplished in accordance with my invention by providing a second coincidence circuit 240 to operate the inhibitor. One input terminal $240a$ of this coincidence circuit is connected to the output $20u$ of the delay circuit 20 so that pulses arrive at this input terminal only when pulses are passing through the delay circuit, that is to say, when the bi-stable element is in its active state.

With this arrangement, it is possible to switch the bi-stable element from its active to its inactive state by applying a pulse coincident with one of the clock pulses to the input 240b of the coincidence circuit 240 to cooperate with a pulse from the delay circuit in producing a pulse to actuate the inhibitor 50. On the other hand, a pulse applied to the input terminal 240b of the coincidence circuit 240 when the bi-stable element is in inactive state has no effect as there is then no pulse at the other terminal 240a of this coincidence circuit. Consequently, a pulse applied at the terminal 240b does not prevent the starting of the flow of pulses through the delay circuit by a pulse applied to the input 60b of the alternate circuit 60. It is, therefore, possible to cycle the bi-stable element by connecting the signal sourve $v$ both to the input 60b of the alternate circuit 60 and to the input 240b of the second coincidence circuit 240, as shown in Fig. 2.

Assuming the bi-stable circuit to be in inactive condition, the operation of the second part of my method is as follows: The first selected signal pulse at the terminal $v$ is applied to the input 60b of the alternate circuit 60 and to the input terminal 240b of the coincidence circuit 240. As the bi-stable element is in inactive condition, the pulse has no effect at the coincidence circuit 240, but its arrival at the coincidence circuit 140 through the alternate circuit 60 switches the bi-stable element into active condition.

The next selected signal pulse is applied in the same way. This pulse has no effect on the coincidence circuit 140, but its arrival at the coincidence circuit 240 actuates the inhibitor 50 and switches the bi-stable element from active to inactive condition. The pulse from the output of the coincidence circuit 240 which actuates the inhibitor also appears at the output terminal $w$ of the scaler circuit.

Thus, every alternate selected signal pulse appears at the output terminal $w$ so that the number of pulses at the output terminal is equal to one-half the number of selected signal pulses, which is one-half the number of the randomly spaced pulses at the source S of the circuit of Fig. 1. The circuits of Figs. 1 and 2, therefore, constitute a scaler circuit having a scale of two to one.

To divide the number of randomly spaced pulses by a larger factor, it is necessary merely to provide the scaler circuit of Fig. 2 with more than one bi-stable element or to combine more than one of the circuits of Fig. 2.

A circuit for dividing the number of signal pulses by $n$ by the use of $(n-1)$ bi-stable elements is shown in the block diagram, Fig. 3. This diagram shows a series of $(n-1)$ bi-stable elements which are like the bi-stable elements shown in Fig. 2. Each bi-stable element has a starting element consisting of an alternate circuit 60 whose output is connected to its coincidence circuit 140. One terminal 60a of the alternate circuit 60 of each bi-stable element is connected to the output of the delay circuit 20 of the preceding element, while the other terminal of each alternate circuit is connected to the signal source $v$.

Only one stopping element is provided. The inhibitor 50 is placed between the clock and the delay circuit of the first bi-stable element and is controlled by the last bi-stable element. A coincidence circuit 240 has one of its input terminals 240a connected to the output of the delay circuit of the last bi-stable element, its other input 240b connected to the signal terminal $v$, and its output 240u is connected to the actuating terminal 50c of the inhibitor 50.

The operation is similar to that already described. The first signal pulse cooperates with a clock pulse to place the first bi-stable element in its active state. The second signal pulse cooperates with the delayed signal from the first bi-stable element to place the second bi-stable element in active state. Each successive signal pulse places one more bi-stable element in active state until the $n$th signal pulse arrives. This pulse cooperates with the delayed pulse of the $(n-1)$ bi-stable element to actuate the inhibitor and place all the bi-stable elements in inactive state. Only the $n$th pulse appears at the output terminal $w$, so that the number of pulses at the output terminal is equal to the number of signal pulses or the number of random pulses divided by $n$.

It is frequency desirable to use a scale of ten, that is, to divide the number of random pulses by ten. This can be done by the arrangement shown in Fig. 3 by the use of nine bi-stable elements. It can be done more economically by combining four of the scaler circuits shown in Fig. 2 in the manner indicated in Fig. 4. Four of the scaler circuits of Fig. 2 are connected in cascade by connecting the output terminal $w$ of each circuit to the signal terminal $v$ of the following circuit. A single clock is used to supply the clock pulses for all four scaler circuits.

In addition to the cascaded connection of the four scaler circuits, the output terminal $w_1$ of the first scaler circuit and the output terminal 20u of the delay circuit 20 of the fourth scaler circuit (or more desirably the amplifier output 70u) are connected to the two input terminals 340a and 340b of a coincidence circuit 340. The output terminal circuit 340u of this coincidence circuit is connected to the actuating terminal 50c of the inhibitors 50 of all four scaler circuits. These connections contain rectifiers 81, 82, 83 and 84 in the form of crystal diodes to prevent return flow on pulses through them.

The operation of the circuit of Fig. 4 will be explained by use of the following table which shows the condition of the bi-stable element of each scaler circuit after each one of the first ten signal pulses has been received at the input $v_1$ of the first scaler circuit. In this table, the word "starts" indicates a change of the bi-stable element from inactive to active state, and the word "stops" indicates a change from active state to inactive state. It is assumed that the bi-stable elements from all four of the scaler circuits are in inactive state before the arrival of the first signal pulse:

| Signal Pulses | Scaler 1 | Scaler 2 | Scaler 3 | Scaler 4 |
| --- | --- | --- | --- | --- |
| 1 | starts | | | |
| 2 | stops | starts | | |
| 3 | starts | | | |
| 4 | stops | stops | starts | |
| 5 | starts | | | |
| 6 | stops | starts | | |
| 7 | starts | | | |
| 8 | stops | stops | stops | starts |
| 9 | starts | | | |
| 10 | stops | starts | | |

As appears from the table, the fourth scaler circuit is placed in active state for the first time by the eighth signal pulse; but, as appears from the time diagram on Fig. 2, no pulse is present at the output of the delay circuit of the fourth scaler crcuit until the expiration of one clock-pulse interval after the eighth signal pulse. Consequently, the first pulse from the delay circuit of the fourth scaler circuit does not appear until one clock-pulse interval after the pulse at the output terminal of the first scaler circuit which occurs on the eighth signal pulse.

At the time of the tenth signal pulse another pulse appears at the output terminal $w_1$ of the first scaler circuit. At this time there is a pulse at the output of the delay circuit of the fourth scaler circuit as this scaler circuit has been in active state for some time. Therefore, on the tenth signal pulse, the first pulse appears at the output of the coincidence circuit 340. This pulse actuates the inhibitors of all four scaler circuits to cut off the clock pulses and, therefore, returns each scaler circuit to inactive condition so that the whole operation starts over again at the eleventh signal pulse. The output terminal $x$ of the entire circuit is connected to the output 340u of the coincidence circuit so that a pulse appears at this output at every tenth signal pulse; that is, the number of pulses at the output $x$ is one-tenth the number of signal pulses.

It should be noted that in the operation which has been described, no use is made of the output terminal $w_4$ of the fourth scaler circuit. Figure 4 represents the manner in which four already existing scaler circuits like the scaler circuit of Fig. 2 may be combined to produce a scale-of-ten circuit. If the scale-of-ten circuit is not made from pre-existing scale-of-two circuits, the output terminal $w_4$, the coincidence circuit 240 of the fourth scaler circuit and the rectifier 84 may be omitted, as these parts are not required in the operation of the scale-of-ten circuit. Also the output 340u need not be connected to the inhibitor of the first scaler circuit, so that this connection including the rectifier 81 may be omitted.

In Figs. 5 and 6, I have shown circuit diagrams corresponding to the block diagrams of Figs. 1 and 2. To facilitate reading Figs. 5 and 6 with Figs. 1 and 2, the elements indicated by the blocks in Figs. 1 and 2 are enclosed in dotted lines in Figs. 5 and 6 and identified by the same numbers as have been used to identify the blocks of Figs. 1 and 2.

The operation of the circuit shown in Fig. 5 is as follows:

A positive pulse applied to the terminal 30a from the detector output Su causes crystal diode 31 to conduct, charging condenser 32 to a voltage nearly equal to the peak pulse voltage. Crystal 33 is maintained cut-off due to positive bias of 25 volts applied to its cathode, this bias being greater than the amplitude of the pulse received from terminal Su. When the pulse voltage applied at terminal 30a disappears, the voltage at terminal 40a of the coincident circuit 40, which is the voltage across condenser, remains high since the resistance of the crystal diode 31 to the flow of current in the reverse direction is very high.

Prior to the advent of the first positive pulse at terminal Su, positive pulses from the clock 10 appeared at terminal 40b of the coincidence circuit 40. In coincidence circuit 40 crystal diodes 43 and 44 are normally conducting. The potential at their common point is clamped at about 45 volts by crystal diode 45. Crystal diodes 43 and 44 each carry about 9 ma. in this condition. The resistor 46 connected between the common point of crystal diodes 43, 44 and 45 and the positive 150 volt terminal is chosen so that the current in it is less than that in either crystal diode 43 or 44. In this case the current in the resistor 46 is approximately 4 ma. in this state. When only one of the crystal diodes 43 and 44 is cut off (rendered non-conducting) by the presence of a positive pulse applied at its cathode, no output pulse is observed at terminal 40u since the other crystal, 44 or 43, remains conducting and the clamping crystal diode 45 can therefore continue to hold the potential at the common point of crystal diodes 43 and 44 at plus 45 volts. This is the situation up to the time of arrival of the input voltage at terminal 40a from the pulse stretcher circuit 30.

Following the advent of a pulse from the source Su a positive voltage is applied to terminal 40a of the coincidence circuit 40 as described above. This cuts off crystal diode 44 but crystal diodes 43 and 45 remain conducting and no output pulse is obtained until the time when the next clock pulse is applied at terminal 40b. When this occurs both crystal diodes 43 and 44 are cut off. At this instant the voltage at their common point which is also the output point of the circuit starts to rise toward 150 volts and crystal diode 45 cuts off. This rise is along an exponential curve having an RC time constant made up of the resistance of resistor element 46 and the stray capacity to ground from the common point of crystal diodes 43, 44 and 45. Since this capacity can be held to a small value the rise can be very fast. This accounts for the fact that this circuit can be used at very high speeds. When the voltage at the common point of the three crystal diodes rises to the positive voltage level applied at either cathode one or both of the crystal diodes 43 or 44 again become conducting and the pulse levels off. When the clock pulse disappears from terminal 40b of the coincidence circuit 40 or the pulse stretcher voltage falls at terminal 40a, the stray capacity to ground from the common point of the three crystal diodes is quickly discharged through crystal diodes 43 and 44 and the pulse at the output terminal disappears.

Therefore, following the application of a pulse at terminal 30a, a positive voltage is applied at terminal 40a from condenser 32 for a considerable length of time compared to the spacing of the regular clock pulses. At the next clock pulse at terminal 40b therefore, we have have a coincidence between this positive voltage from condenser 32 and the clock pulse, and an output pulse from the coincidence circuit is obtained, coincident in time with the clock pulse and having the same shape as the clock pulse, at the output terminal 40u of the coincidence circuit 40. This pulse appears at the output terminal v.

The output pulse from the coincidence circuit 40 is used to discharge the pulse stretcher 30. Operation is as follows: The output pulse from the coincidence circuit 40 is fed back to the discharge terminal 30d of the pulse stretcher circuit 30. It is delayed in a delay line 36 by an amount roughly equal to the pulse width of the clock pulses. This delayed pulse is applied to the grid of an inverter amplifier 34 comprising elements 171, 172, 173 and 174. The current in this amplifier with no pulse applied is held to a small amount by cathode bias. A positive pulse on its grid causes a surge of current in the plate circuit. Transformer 35 is connected in the plate circuit of this amplifier and its secondary provides a negative pulse which is used to overcome the positive 25 volts bias on crystal diode 33. With the bias thus removed, crystal diode 33 becomes a low resistance and quickly discharges the pulse stretching condenser 32 thus readying it for the next signal pulse. The delay incorporated in element 36 is to maintain the shape and size of the pulse at the output terminal v. If it were not for this short delay the output signal voltage at terminal 40u might start to cause the discharge of the pulse stretcher condenser too soon and the falling voltage at terminal 40a would result in a very narrow and much attenuated output pulse.

The operation of the circuit shown in Fig. 6 is as follows:

Pulses from the clock 10 are fed to the selected signal circuit. Following the advent of each random pulse from the source Su, a single pulse in time coincidence with a pulse from the clock 10 appears at the output terminal v of the selected signal circuit as described in the previous section. Such a pulse is called a selected signal pulse.

The first selected signal pulse at terminal v is applied at terminal 60b of the alternate circuit 60, and terminal 240b of coincidence circuit 240. At this time there is no voltage present at terminal 240a of coincidence circuit 240 so this circuit remains inactive and there is no output pulse at terminal 240u. The pulse at terminal 60b of the alternate circuit 60 caused crystal diode 63 to conduct and the voltage at the output terminal 60u of the alternate circuit 60 rises simultaneously. It is to be noted that as this voltage rises the cathode voltage of crystal diode 64 rises above its plate voltage and it is cut off. For this reason the input pulse applied to terminal 60b does not reach terminal 60a. This then is the function of the alternate circuit. Input pulses at either terminal 60a or 60b reach the output terminal but do not affect the other input terminal.

The first selected signal pulse applied at terminal 60b of the alternate circuit 60, therefore, reaches terminal 60u and input terminal 140b of the coincidence circuit 140. At the same time, a coincident pulse from the clock is present at input terminal 140a of coincidence circuit 140. This pulse has passed through inhibitor circuit 50 from the clock. Operation of the inhibitor circuit with no pulse applied to terminal 50c is as follows: With no pulse applied at terminal 50a, crystal diodes 53 and 55 are conducting and the potential at their common point is clamped by crystal 55 to a potential of 45 volts. Crystal diode 58 is held cut off by the potential of 55 volts applied to its cathode since this is greater than the potential at its plate by 10 volts. When a pulse from the clock reaches terminal 50a, diode 53 is cut off and the potential at the common point of crystal diodes 53 and 55 starts to rise towards 150 volts. As soon as this rise begins crystal diode 55 is cut off since its cathode voltage rises above its plate voltage. The rise at the common point of the diodes is along an exponential curve with a time constant determined by the size of the resistor element 54 and the capacity to ground from the common point of the crystal diodes 53 and 55. Since this RC time constant is very short and since the attempted voltage rise is large, the output pulse at terminal 50u with no pulse applied at terminal 50c follows the shape of the clock pulse applied at terminal 50a.

Thus, at the time of the first selected signal pulse, we have coincident pulses applied to terminals 140a and 140b of coincidence circuit 140. Action of this circuit is then as follows: Prior to the application of the coincident pulses at the input terminals, crystal diodes 143, 144 and 145 are all conducting. The potential at the common point of these crystal diodes is clamped at 45 volts by the action of crystal diode 145. When diodes 143 and 144 are cut off by the application of positive pulses to their cathodes at the same time, the clamping diode 145 can no longer carry any current since it no longer has a path to ground. The potential at the common point of the crystal diodes then rises rapidly towards plus 150 volts until the voltage at this point equals the pulse voltage applied at terminals 140a and 140b. When this level is reached, crystal diodes 143 and 144 again become conducting and the pulse levels off. When the pulses at the input terminals disappear, the diodes 143 and 144 become low resistances and quickly discharge the capacity to ground from their common point and the circuit returns to its original quiescent state. The coincident output pulse at the common point of the crystal diodes 143, 144 and 145 is coupled out through condenser 149 to output terminal 140u and delay circuit input terminal 20a.

The delay circuit 20 provides a delay equal to the time between clock pulses. The delay circuit illustrated is an artificial transmission line.

The output pulse from the delay circuit is fed to input terminal 70a of the amplifier 70. This amplifier serves to make up for the attenuation suffered by the pulse in the delay circuit and to reshape the pulse. A positive pulse fed into the grid of this amplifier causes a surge of current in its plate circuit which contains polarity-inverting transformer 72. This surge of current in the primary of the transformer gives rise to a positive pulse at the output terminal of the transformer and of the amplifier 70u.

The pulse from the amplifier at terminal 70u is delayed from the original coincidence obtained in coincidence circuit 140 by the time between clock pulses. This delay is .1 microsecond in the case chosen as an example in Fig. 6. This pulse from the output terminal 70u of the amplifier 70 reaches input terminal 60a of the alternate circuit 60 and reaches the output terminal 60u of this circuit as previously described without affecting terminal 60b. At this time the next clock pulse following the one which gave the first coincidence is present at input terminal 140a of this coincidence circuit. We then have a second coincidence and the output pulse at terminal 140u produced as a result of this coincidence is again fed into the input of the delay circuit 20. It will be noted that a process has been started in which pulses will continue to circulate around the path through the coincidence circuit 140, the delay circuit 20, the amplifier 70, and the alternate circuit 60 unless the clock input at terminal 140a of the coincidence circuit 140 is interrupted by the action of the inhibitor 50.

It has been noted that an output pulse is present at terminal 70u of the amplifier 70 at the time of the clock pulse following the one which gave the first coincidence and that such pulses continue to appear at this terminal in time coincidence with clock pulses up to and including time at which the flow of clock pulses to terminal 140a is interrupted by the inhibitor 50. These pulses from terminal 70u of the amplifier 70 are applied to terminal 240a of coincidence circuit 240 as well as to terminal 60b of alternate circuit 60. Operation of coincidence circuit 240 is precisely like that of coincidence circuit 140. Note that no pulse is present at terminal 240a of coincidence circuit 240 until the clock pulse following the one giving the first output pulse from coincidence circuit 140. Thus no output is obtained from coincidence circuit at the time of the first selected signal pulse.

Operation at the time of the second selected signal pulse is as follows: Whenever this selected signal pulse occurs, at the time of the next clock pulse, a coincident output pulse is obtained between it and a coincident clock pulse applied at terminal 240a. The output pulse obtained at terminal 240u at the time of this coincidence serves two functions. First, it is the output pulse from the scaler. Second, it is fed to terminal 50c of the inhibitor circuit 50. Here it is inverted in the amplifier 56 and applied as a negative pulse to the cathode of crystal diode 58. Prior to the application of this pulse crystal diode 58 was held cut off by the application of a positive potential of 55 volts at its cathode, its plate being at 45 volts. At the time of the input pulse to terminal 50c, the cathode voltage is driven below 45 volts and the diode becomes conducting. At this time, crystal diode 53 has been cut off by the action of the incoming clock pulse applied at terminal 50a but since an alternate path to ground for current is now provided through the previously non-conducting diode 58, the clamping diode 55 contines to conduct and the output voltage does not rise. This prevents a clock pulse from reaching terminal 140a of coincidence circuit 140 at this time and no coincidence is obtained in this circuit. At the time of occurrence of the next clock pulse the inhibitor again passes a pulse through to terminal 140a of coincidence circuit 140 but again no coincidence is obtained since there is now no pulse coming in at terminal 140b via the delay circuit, amplifier and alternate circuit since no pulse was fed into this circuit at the time of occurrence of the preceding clock pulse. From this it is seen that the second selected signal pulse returns the bistable element comprising the alternate circuit 60, coincidence circuit 140, delay circuit 20, and amplifier 70, to the inactive state. It also produces a coincidence in coincidence circuit 240 which provides the output pulse at terminal 240a of this coincidence circuit and at terminal w of the scaler.

It can now be seen at once that the sequence of operation described above will be repeated for each pair of selected signal input pulses, each pair giving a single output pulse, the result being therefore a scale-of-two circuit.

It should be noted that these output pulses are in themselves selected signal pulses since they are in time coincidence with clock pulses. Consequently they can be used to operate succeeding stages of counting without modification.

To facilitate the carrying out of my invention by those skilled in the art, I will list constants and other data as to the electrical devices shown in Figs. 5 and 6:

*Elements in Fig. 5.*—38, 41, 42 and 49 are 120 micromicrofarad condensers. 39, 173 and 184 are .01 microfarad condensers. 32 is 300 micromicrofarad condenser. 37, 47 and 48 are 5,100 ohm ½ watt resistors. 46 is 27,000 ohm ½ watt resistor. 171 is 22,000 ohm ½ watt resistor. 172 is 220 ohm ½ watt resistor. 31, 33, 43, 44 and 45 are Germanium crystal diodes, type 1N34. 36 is delay line with a period of .025 microsecond of the type manufactured by Shallcross Manufacturing Co. 35 is transformer wound on ferrite torus approximately 1 inch in diameter with a cross-section of ⅛ by ¼ inch. The primary consists of 14 and the secondary of 18 turns of No. 34 insulated wire. 34 is amplifier tube, type 6J6.

*Elements in Fig. 6.*—51, 141, 142, 149, 61, 62, 241 and 242 are 120 micromicrofarad condensers. 74 and 76 are .01 microfarad condensers. 52, 65, 66, 147, 148, 247 and 248 are 5,100 ohm ½ watt resistors. 54, 146 and 246 are 27,000 ohm ½ watt resistors. 67 is 10,000 ohm ½ watt resistor. 73 is 68,000 ohm ½ watt resistor. 75 is 2,200 ohm ½ watt resistor. 71 is amplifier tube, type 6AN5. 72 is transformer identical to element 35 of Fig. 5. 53, 55, 58, 143, 144, 145, 63, 64, 243, 244 and 245 are Germanium crystal diodes, type 1N34. 20 is delay line with a period of .1 microsecond of the type manufactured by Shallcross Manufacturing Co.

For purposes of completeness the detailed operation of the amplifiers shown in Figure 5 and Figure 6 will now be given:

Operation of the inverter amplifier shown in Figure 5 and comprising elements 34, 171, 172, 173 and 174 is as follows: The amplifier tube 34, a type 6J6 triode has a plate potential of plus 150 volts applied through the primary of transformer element 35. The cathode bias resistor element 172, together with the cathode bypass condenser element 173 provide a fixed positive cathode bias of 2 volts. This bias limits tube current with no signal applied at the grid to about 10 ma. The grid is returned to ground thorugh element 171, a 22,000 ohm resistor which also serves as the terminating resistance of the delay line element 36. When a positive pulse of about 8 volts amplitude is applied to the grid from the delay line output a surge of current reaching 40 ma. flows in the plate circuit of the tube inducing a voltage of about 28 volts in the secondary of transformer element 35. This pulse overcomes the bias on crystal diode element 33, this diode becomes conducting and discharges the pulse stretching condenser, element 33 as previously described.

Operation of the inverter amplifier, element 56 of the inhibitor circuit 50 of Figure 6, is as follows: Because of space limitations the individual elements of this amplifier were not numbered in the drawing, Figure 6. Their positions, sizes and circuit functions will all be given in the following description. The purpose of this amplifier is to invert the positive pulse applied at terminal 50c of the inhibitor. This is done to provide the negative pulse necessary to actuate inhibitor circuit.

The input pulse from terminal 50c is applied to the grid of the amplifier tube after passing through a coupling circuit. This coupling circuit consists of a series condenser of 120 micromicrofarads between terminal 50c and the grid of the amplifier tube, and a resistor of 5,100 ohms from the grid of the tube to ground. Its purpose is to pass the pulse of voltage applied at terminal 50c while blocking the D.C. potential found at terminal 240u. The amplifier tube is a 6J6 triode. A positive cathode bias of 1.5 volts is provided by the action of a cathode resistor of 220 ohms, and a cathode bypass condenser of .01 microfarad connected from the cathode of the tube to ground. With this bias and no signal applied at the grid the current in the tube is about 7 ma. The plate load resistor is connected between the plate of the amplifier and the positive supply voltage point. This is an 8.2K1 watt resistor. The 10 volt positive pulse applied at the grid of the tube suffers some grid clipping and appears at the plate of the tube as a negative pulse of about 15 volts amplitude. This negative pulse is coupled through a 120 micromicrofarad condenser to the common point of crystal diode, element 58 and resistor element 57. This overcomes the bias on the crystal diode, element 58, permitting current to flow through this element and actuating the inhibitor circuit as described previously.

The amplifier circuit 70, of Figure 6, is used to make up for the attenuation of the pulses suffered in passing through the delay circuit, element 20. Its operation is as follows: The grid return resistor and terminating resistor of the delay circuit is element 73. Elements 74 and 75 provide a positive cathode bias of 6 volts limiting the tube plate current with no pulse applied at the grid of the tube to about 3 ma. The screen supply volts is plus 150 volts and the screen is bypassed to ground by element 76. A positive pulse of 3 volts amplitude causes a surge of current in the plate circuit reaching 30 ma. This current in the primary induces a voltage of about 20 volts in the secondary of the transformer, element 72 and provides the output pulse to terminals 60a and 240a as previously described.

The drawings and the specific description have been given for the purpose of explaining the principle of my invention and enabling one skilled in the art to make and use a specific embodiment of my new scaler circuit. They should not be understood as limiting the scope of my invention, as many changes may be made in these specific circuits described without departing from the principle of my invention. Among the more obvious changes which will be apparent to those skilled in the art, I may mention the following:

The amplifiers 34, 56, 70 shown in the drawings are not an essential part of my invention. They are desirable to prevent too great attenuation of the pulses when such attenuation occurs in other parts of the circuit; but, in cases where the attenuation is not serious, amplifiers may be omitted. It is apparent also that other types of amplifiers may be substituted for the particular type shown in the drawings and that this may be done without changing the polarity of the pulses in various parts of the circuit. Thus, for example, a two-stage amplifier may be substituted for the amplifier 70 and, in this case, the inverting transformer 72 may be omitted. If the amplifier 34 of Fig. 5, is omitted, the transformer 35 should be changed to a polarity-inverting transformer. In slow speed applications the amplifier tube may be used directly to discharge the condenser element 32 via the crystal diode element 33. The form shown in Fig. 5 has the advantage of very fast speed.

As noted above, the elements $w_4$, 240 and 84 of the fourth scale-of-two circuit shown in Fig. 4 may be omitted. Likewise the alternate circuit 60, preceding the coincidence circuit 240 shown in Figure 3 can be eliminated.

The inhibitor 50 and coincidence circuit 140, which are shown as separate circuits in Fig. 6, may be combined into a single circuit of the type known as a coincidence circuit with inhibitor terminal. In order to do this, it is necessary merely to omit the elements identified as 51, 52, 53, 54 and 55 so that the clock output 10u is connected directly to the input 140a, to eliminate the lead from the cathode of the rectifier 58 and substitute a connection from this cathode to a point in the coincidence circuit 140 between the cathodes of rectifiers 143 and 144. The combined circuit thus produced is electrically equivalent to the separate inhibitor and coincidence circuit of Fig. 6. It involves a simplification which is desirable in practice, but is less easily explained than the separate form which has been illustrated.

The artificial line used as the delay circuit 20 may be replaced by any other type of delay circuit which delays a pulse for a period equal to the clock pulse interval.

What I claim is:

1. A scaling circuit comprising an input terminal for receiving input pulses, a single clock pulse source producing a single train of clock pulses, pulse combining means connected to the input terminal and to the clock pulse source for providing a series of signal pulses whose number is equal to the number of input pulses and whose spacing corresponds approximately to the spacing of those pulses but differs from it to the extent that the time intervals between successive signal pulses are all multiples of the time interval between successive clock pulses and that each signal pulse is coincident with a clock pulse, and clock-operated scaling means connected to said pulse combining means and to said clock pulse source for providing a pulse for each set of a predetermined number of coincidences of a signal pulse with a clock pulse.

2. A counter for pulses from a pulse source comprising an input terminal for receiving source pulses, a clock pulse source, pulse stretching means connected to the input terminal for lengthening the duration of said source pulses, pulse producing means connected to said pulse stretching means and to the clock pulse source to produce a signal pulse for each coincidence of a lengthened pulse with a clock pulse, and means connected to said pulse producing means and to said clock for producing a pulse for each set of a predetermined number of coincidences of a signal pulse and with a clock pulse.

3. A scaler circuit comprising an input terminal for receiving source pulses from a pulse source, a clock producing pulses at regular time intervals, pulse stretching means connected to the input terminal for lengthening the duration of said source pulses, pulse producing means connected to said pulse stretching means and to said clock to produce a signal pulse for each coincidence of a lengthened pulse with a clock pulse, a clock-operated bi-stable element, a stopper for said bi-stable element connected between the clock and the bi-stable element and a starter for said bi-stable element connected between the pulse producing means and said bi-stable element.

4. Means for producing a series of pulses equal to a simple fraction of the number of pulses in a series of pulses obtained from a pulse source, comprising an input terminal for receiving said source pulses, a pulse stretcher including a starting terminal, a stopping terminal and an output terminal and having its starting terminal connected to said input terminal, a clock producing pulses at regular time intervals, a coincidence circuit having one input connected to the clock, its second input connected to the output terminal of the pulse stretcher and its output connected to the stopping terminal of the pulse stretcher and a clock-operated scaler circuit connected to the clock and to the output of the coincidence circuit in parallel.

5. A counter for counting pulses obtained from a source of pulses comprising an input terminal for receiving source pulses, a clock pulse source, a condenser, charging means connecting the input terminal to the condenser to charge the same by means of said source pulses, discharging means connected to the condenser for discharging the same, a coincidence circuit for producing signal pulses having one input connected to the charged terminal of the condenser, its second input connected to the clock pulse source and its output connected to the discharging means and means connected to the output of the coincidence circuit and to the clock for producing a pulse for each set of a predetermined number of coincidences of a signal pulse with a clock pulse.

6. The combination for producing a series of signal pulses equal in number to a series of pulses obtained from a pulse source and each of which is coincident with a clock pulse comprising an input terminal for receiving said source pulses, a single clock pulse source producing a single train of clock pulses, pulse stretching means connected to the input terminal for lengthening the duration of said source pulses, and means connected to said pulse stretching means and to the clock pulse source to produce a signal pulse for each coincidence of a lengthened source pulse with the clock pulse next in order of time following the source pulse which is lengthened.

7. Means for producing a series of signal pulses equal in number to a series of pulses obtained from a pulse source and each of which is coincident with a clock pulse, comprising an input terminal for receiving said source pulses, a pulse stretcher including a starting terminal, a stopping terminal and an output terminal and having its starting terminal connected to said input terminal, a clock producing pulses at regular time intervals and a coincidence circuit having one input connected to the clock, its second input connected to the output of the pulse stretcher and its output terminal connected to the stopping terminal of the pulse stretcher and to an output terminal.

8. A circuit for producing a series of signal pulses corresponding in number to a series of pulses obtained from a source of pulses comprising an input terminal for receiving said source pulses, a clock pulse source, a condenser, charging means connecting the input terminal to the condenser to charge the same by means of said source pulses, discharging means connected to the condenser for discharging the same and a coincidence circuit having one input connected to the charged terminal of the condenser, its second input connected to the clock pulse source and its output connected to the discharging means and to an output terminal.

9. A pulse stretcher for stretching the pulses of a series of input pulses which may be of irregular spacing and irregular width, comprising an input terminal, an output terminal, a discharge terminal, a source of voltage of the same phase as the voltage of the input pulses and of a higher value, a polarity-inverting element, a circuit connecting the input terminal with said source of voltage and containing two rectifiers in series, a condenser connected to said circuit between the two rectifiers, a connection between the condenser and the output terminal, and a connection from the discharge terminal through the polarity-inverting element to the source of voltage.

10. Means for producing a series of signals equal in number to a series of input pulses and each coincident with a pulse of a set of regularly spaced pulses, comprising the combination of a pulse stretcher as claimed in the preceeding claim, a coincidence circuit having one of its input terminals connected to the output terminal of the pulse stretcher and having its output terminal connected to the discharge terminal of the pulse stretcher, and a source of regularly spaced pulses connected to the other input terminal of the coincidence circuit.

11. Means for producing a series of signals equal in number to a series of input pulses and each coincident with a pulse of the set of regularly spaced pulses, comprising a source of input pulses, a clock producing regularly spaced pulses of uniform width, a coincidence circuit having one of its inputs connected to the clock, a source of voltage, a circuit connecting the source of input pulses with the source of voltage and containing two rectifiers in series, a condenser connected to said circuit between the two rectifiers, a connection between the condenser and the other input of the coincidence circuit, and a connection from the output of the coincidence circuit to said source of voltage containing a polarity-inverting element and a delay element having a delay period as great as the width of the clock pulses and less than the intervals between successive clock pulses.

12. A scaler circuit comprising the combination with a clock producing pulses at regular time intervals of a clock-operated bi-stable element including a delay circuit having a delay period equal to the time between successive clock pulses and a coincidence circuit having its output directly connected to the input of said delay circuit, an inhibitor for clock pulses having an actuating terminal and having its input connected to the clock and its output connected to the first input of said coincidence circuit, a source of signal pulses coincident with some of the clock pulses, an alternate circuit having one input directly connected to said source, a second input connected to the output of said delay circuit and its output directly connected to the second input of said coincidence circuit and a second coincidence circuit having its first input connected to the output of the delay circuit, its second input connected to said source of signal pulses and its output connected to the actuating terminal of the inhibitor and to an output terminal.

13. A scaler circuit including a clock producing pulses at regular time intervals, a series of clock-operated bi-stable elements each of which is stable in active and inactive states, a starter for each bi-stable element which has no effect on said element when in active state, a stopper for the series of bi-stable elements which has no effect when any of them is in inactive state, and a source of signals coincident with some of the clock pulses connected to the starters and the stopper in parallel.

14. A scaler circuit including a clock producing pulses at regular time intervals, a series of clock operated bi-stable elements, a stopper connected between the clock and the first input of the first of said bi-stable elements, and each succeeding bi-stable element having its first input connected to the output of the preceding bi-stable element, a coincidence circuit having its first input connected to the output of the last bi-stable element and its output connected to the actuating terminal of the stopper, and a source of signals coincident with some of the clock pulses connected to the second input of the bi-stable elements and to the second input of the coincidence circuit in parallel.

15. A scaler circuit comprising the combination of a clock producing pulses at regular time intervals, a series of clock-operated bi-stable elements each including a delay element having a delay period equal to the time interval between successive clock pulses and a coincidence circuit having its first input and its output connected between its input terminal and its delay element and its second input connected to the output of its delay element, an inhibitor connected to the output of the clock, a source of signal pulses coincident with some of the clock pulses, means for cycling the series of bi-stable elements by successive signal pulses including a final coincidence circuit whose output is connected to the actuating terminal of the inhibitor and whose first input is connected to the output of the delay element of the last one of the series of bi-stable elements, and parallel connections from said source to the second inputs of the coincidence circuits of the bi-stable elements and the second input of the final coincidence circuit.

16. A scaler circuit including a clock producing pulses at regular time intervals, an inhibitor having its input connected to the output of the clock, a series of clock-operated bi-stable elements, each including a delay element and a coincidence circuit having its output connected to the input of the delay element, the first of said bi-stable elements having the first input of its coincidence circuit connected to the output of the inhibitor, and each succeeding bi-stable element having the first input of its coincidence circuit connected to the output of the delay element of the preceding bi-stable element, an alternate circuit for each bi-stable element having its first input and its output connected between the output of its delay element and the second input of its coincidence circuit, a final coincidence circuit whose output is connected to the actuating terminal of the inhibitor and whose first input is connected to the output of the delay element of the last one of the series of bi-stable elements, and a source of signals coincident with some of the clock pulses connected to the second inputs of the alternate circuits and to the second input of the final coincidence circuit in parallel.

17. A scale-of-ten scaler circuit comprising four cascaded scale-of-two scaler circuits each containing an inhibitor and a delay element whose input is connected to the output of the inhibitor and whose output is connected to the output of the scale-of-two circuit, and a coincidence circuit having its inputs connected to the output of the first scale-of-two circuit and to the output of the delay element of the fourth scale-of-two circuit and its output connected to the actuating terminal of the inhibitors of the second and third scale-of-two circuits and to an output terminal.

18. A scale-of-ten scaler circuit comprising three cascaded scale-of-two scaler circuits each including an inhibitor, a clock producing pulses at regular time intervals, a clock-operated bi-stable element including a delay element, a stopper for said bi-stable element connected between the clock and the bi-stable element and having its actuating terminal connected to the output of the delay element, a starter for said bi-stable element connected between the output of the third scale-of-two circuit and said bi-stable element, and a coincidence circuit having one input connected to the output of the first scale-of-two circuit, a second input connected to the output of the delay element of said bi-stable element and its output connected to the inhibitors of the second and third scale-of-two circuits and to an output terminal.

19. A scale-of-ten scaler circuit comprising the combination with a clock producing pulses at regular time intervals of four cascaded scale-of-two circuits, each including an inhibitor having its input connected to the clock, a delay circuit and a coincidence circuit having one input connected to the output of the inhibitor, its output connected to the input of the delay circuit and its second input connected to the output of the delay circuit, and a further coincidence circuit having its inputs connected to the output of the first scale-of-two circuit and to the output of the delay circuit of fourth scale-of-two circuit and its output connected to the actuating terminal of the inhibitor of each scale-of-two circuit and to an output terminal.

20. A scale-of-ten scaler circuit comprising three scale-of-two scaler circuits each including an inhibitor for clock pulses connected to a first input terminal, a source of signal pulses coincident with some of the clock pulses connected to the second input of the first scale-of-two circuit, and each succeeding scale-of-two circuit having its second input connected to the output of the preceding scale-of-two circuit, a clock-operated bi-stable element including a delay element and a coincidence circuit having its output connected to the input of the delay element, an alternate circuit for said bi-stable element having its first input and its output connected between the output of the delay element and the second input of the coincidence circuit and its second input connected to the output of the third scale-of-two circuit, an inhibitor for said bi-stable element having its output connected to the first input of the coincidence circuit of the bi-stable element and having its actuating terminal connected to the output of the delay element, a clock producing pulses at regular time intervals connected in parallel to the first input terminals of the scale-of-two circuits and to the input to the inhibitor for the bi-stable element, and a final coincidence circuit having one input connected to the output of the first scale-of-two circuit, a second input connected to the output of the delay element of the bi-stable element and its output connected to the inhibitors of the second and third scale-of-two circuits and to an output terminal.

References Cited in the file of this patent

UNITED STATES PATENTS

| | | |
|---|---|---|
| 2,421,018 | De Rosa | May 27, 1947 |
| 2,552,968 | Hochwald | May 15, 1951 |
| 2,609,533 | Jacobsen | Sept. 2, 1952 |
| 2,653,248 | Perlow et al. | Sept. 22, 1953 |
| 2,687,473 | Eckert et al. | Aug. 24, 1954 |

OTHER REFERENCES

Proc. I.R.E., January 1952, vol. 40, No. 1, pp. 29–33, "Logical Description of Some Digital-Computer Adders and Counters," Gray.

UNITED STATES PATENT OFFICE
CERTIFICATE OF CORRECTION

Patent No. 2,904,679  
September 15, 1959

Charles W. Hoover, Jr.

It is hereby certified that error appears in the printed specification of the above numbered patent requiring correction and that the said Letters Patent should read as corrected below.

Column 5, line 15, for "sourve" read -- source --; column 7, line 26, for "Crystel" read -- Crystal --; column 8, line 10, strike out the word "have", second occurrence; column 10, line 56, after "terminal 240", for the italicized "a" read an italicized -- u --; line 72, for "184 are" read -- 174 are --; column 11, line 61, for "D.C. potential" read -- d.c. potential --.

Signed and sealed this 19th day of April 1960.

(SEAL)  
Attest:

KARL H. AXLINE  
Attesting Officer

ROBERT C. WATSON  
Commissioner of Patents